United States Patent [19]
Sands

[11] 3,832,976
[45] Sept. 3, 1974

[54] COW TRAINER
[76] Inventor: Paul M. Sands, R.D. 2, Coatesville, Pa. 19320
[22] Filed: Nov. 8, 1973
[21] Appl. No.: 414,160

[52] U.S. Cl. ............................................... 119/27
[51] Int. Cl. ........................................... A01k 29/00
[58] Field of Search ................ 119/27, 29; 231/2 E

[56] References Cited
UNITED STATES PATENTS
2,428,875  10/1947  Hantz..................................... 119/27
2,790,416  4/1957   Klinzing................................ 119/27
3,370,570  2/1968   Treangen............................. 119/27

Primary Examiner—Antonio F. Guida
Assistant Examiner—J. N. Eskovitz
Attorney, Agent, or Firm—Paul & Paul

[57] ABSTRACT

A corrosion-resistant height-adjustable electrical contact shock device for use in cow stalls, or other animal stalls, is so insulated and designed that the height adjustment may be made without disconnecting the electrical circuit and without exposing the attendant to the hazard of electrical shock.

2 Claims, 4 Drawing Figures

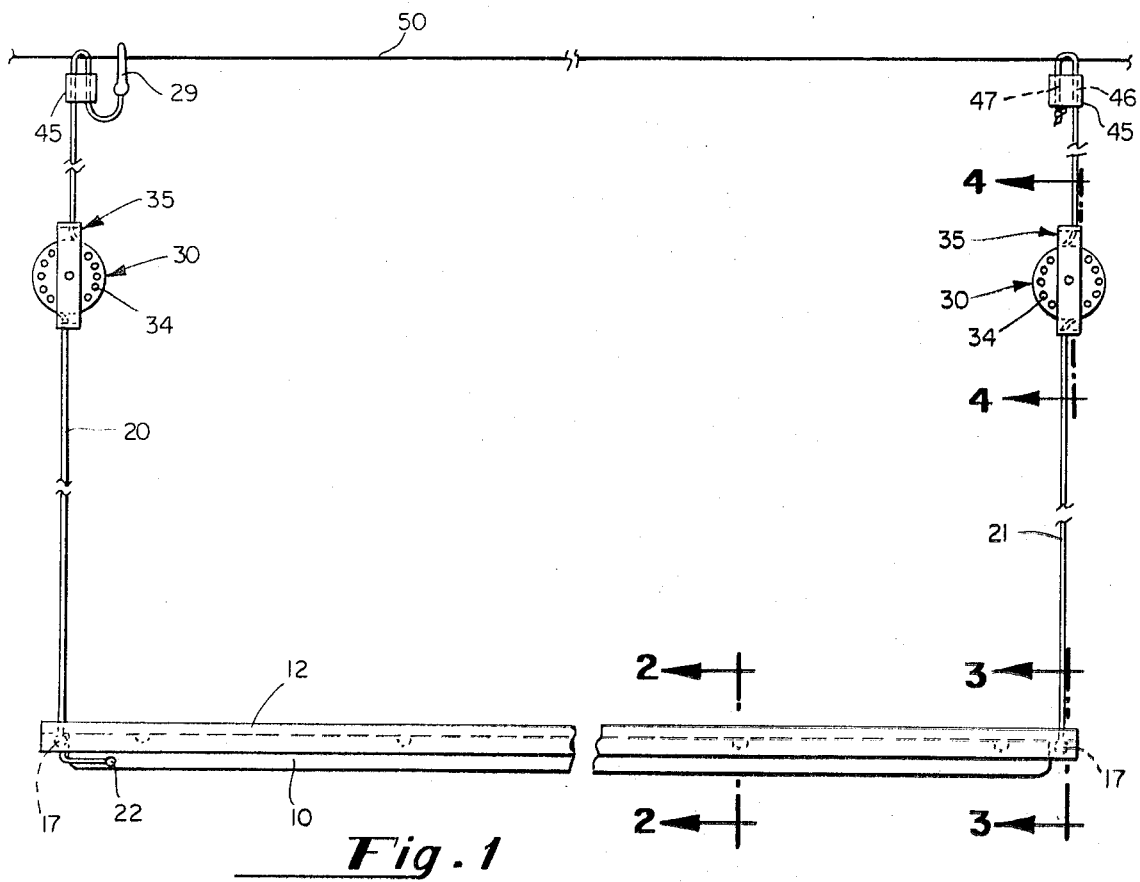
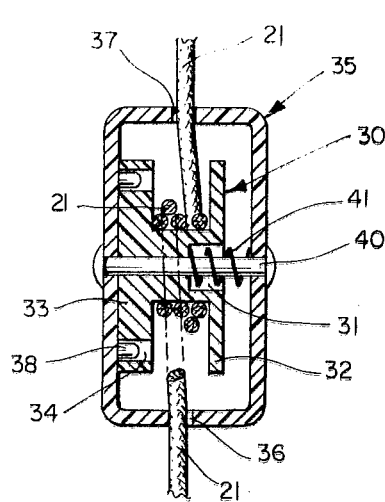
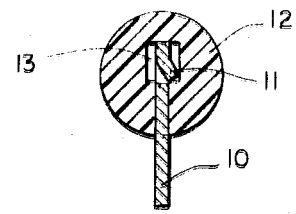
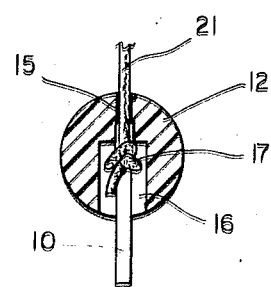

COW TRAINER

BACKGROUND OF THE INVENTION

This invention relates to an electrical shock system for use in cattle or other animal stalls for influencing the position taken by the animal in the stall.

A device of the general type here involved is disclosed in U.S. Pat. No. 2,428,875 granted Oct. 4, 1947 to J. J. Hantz, and the purposes of the device of the present invention includes those purposes described in the aforesaid U.S. patent.

SUMMARY OF THE INVENTION

A principal purpose of the present invention is to provide an electrical shock device for use in cattle stalls and other animal stalls which is adjustable as to its elevational position without disconnecting the electrical circuit and without exposing the adjustor to electrical shock hazards.

Another object is to provide a device of the aforesaid type which is made of corrosion resistant materials which will give it long life when used in the moist environment sometimes encountered in cattle barns.

BRIEF DESCRIPTION OF THE DRAWING

FIG. 1 is an illustration of an electrical shock device provided in accordance with the present invention.

FIG. 2 is a view, in section of the insulator support tube and electric shock bar, looking along the line 2—2 of FIG. 1.

FIG. 3 is a view, in section of the end of the insulator support tube, looking along the line 3—3 of FIG. 1.

FIG. 4 is a view of the adjustment reel, looking along the line 4—4 of FIG. 1.

DETAILED DESCRIPTION OF THE PREFERRED EMBODIMENTS

Referring now to FIG. 1, the device provided by the present invention includes an elongated electric shock bar or rod 10 of corrosion-resistant conductive metal, preferably aluminum, and preferably of flat rectangular cross-sectional shape. Rod 10 is partially confined within, and supported by, an insulator tube 12 of non-conductive material, preferably plastic, and preferably high impact styrene. The insulator support tube 12 may preferably be formed by extrusion, and, as seen in section in FIG. 2, has a lengthwise extending axial bore 13, preferably of rectangular shape, and a lengthwise extending continuous slot 14 which extends downwardly from the bore 13 to the external surface of the tube 12. Slot 14 extends for the full length of the tube 12.

The electric shock rod 10 is supported within the rectangular bore 13 of the tube 12 by tabs 11 which project angularly downwardly at spaced intervals. These tabs 11 may preferably be located alternately on one side and then the other side of the rod 10, and may be readily formed by striking the aluminum rod. The rod 10 extends downwardly through the slot 14 and the lower portion of the blade projects beyond the lower surface of the support tube, as seen in FIG. 1.

At each of the two opposite ends of the insulator support tube 12, a stepped hole 15, 16 may be drilled, as by a two-step drill bit, forming an upper small-diameter hole 15 and a lower larger diameter hole 16.

Suspension means are provided at each end of the device, one of which is required to be an insulated electrical conductor. The other need not be a conductor, since it only performs a support or suspension function.

In the form illustrated, two cords 20, 21 are shown. The one cord, cord 20, in FIG. 1, is an insulated (preferably silicone rubber covered) copper wire having at its upper end a conductive clip 29, preferably of the alligator type, and preferably copper. The lower end of cord 20 is connected conductively to rod 10 at 22.

Cords 20 and 21 each comprise a length, as for example, four feet. Cord 21 may preferably be a double braided fabric. The lower end of each cord 20, 21 is passed through the stepped hole 15, 16 and a knot 17 is then tied at or near the end of the cord. The cord is then pulled upwardly until the knot 17 is received within the lower larger hole 16, as illustrated in FIG. 3. In this manner, the insulator tube 12 is suspended by the cords 20, 21, from the overhead high-voltage supply wire 50.

Each of the cords 20, 21 is wrapped a number of times about a reel 30 (FIG. 4) which is supported rotatably in a rectangular frame 35. Frame 35 is provided with a lower hole 36 and an upper hole 37 through which the cords 20, 21 are threaded. Frame 35 is also provided with a pair of opposing holes in its sidewalls for receiving a pin 40 on which the reel 30 is supported for rotation. Reel 30 and frame 35 may preferably be made of Celcon, a product of Celanese Corporation. This is a very strong hard plastic which is not brittle and is a good insulator.

A compression spring 41, preferably spring stainless steel, biases the reel 30 toward one side of the frame 35, the left side as viewed in FIG. 4. One end of spring 40 bears against the right wall of the frame 35. The other end of the spring 40 is received within a recess 31 in the right annulus 32 of the reel 30 and urges the reel 30 toward the left so that the left annulus 33 of the reel normally abuts against the left sidewall of frame 35.

The left annulus 33 is provided with a series of holes 34 which, as seen in FIG. 1, are located, at regular spaced intervals, along a circular path whose loci is equi-distant from the center axis of the reel 30. The left sidewall of frame 35 is provided with two or more posts or studs 38 which project inwardly and are positioned to enter into two of the holes 34, located on opposite sides of the center pin 40.

At each of the upper ends of the cords 20, 21, a connector 45 is provided having a hole 46 through which the cord is threaded and having a slot 47 into which the cord may be pressed. Slot 47 may have an enlarged lower end for receiving the knot at the upper end of cord 21, as seen in FIG. 1. The upper end of the other cord, the insulated wire cord 20, as previously mentioned, is connected to a conductive clip 29, preferably a copper alligator clip which is clipped on to the bare high-voltage low-current supply conductor 50. Connectors 45 are preferably Celcon.

In operation, the elevational position or height of the shock rod 10 above the ground, and hence above the back of the cow or other animal, may be readily adjusted by the attendant without disconnecting the electrical circuit and without exposing himself to shock hazards. The attendant does this by using his fingers to pull the reel 30 to the right, as viewed in FIG. 4, against the force of the spring 41, until the posts 38 are fully withdrawn from, and clear of, the holes 34 in the annulus 33 of the reel, and then turning the reel 30 rotatably, in one direction or the other, to lengthen or to shorten the cord, as is desired. This is done at both reels to both cords 20 and 21. In performing this adjustment, it is not necessary to shut off the power, since the attendant makes the adjustment without any necessity to touch a live conductor, such as the clip 29, or the rod 10.

The shock rod 10 may preferably have a length of the order of 30 inches, and a total height of ⅞ inch of which ⅜ inch is exposed.

Included among the advantages of the improved shock device are the following: (1) The dial-reel adjustment avoids shock hazard to the attendant without need to shut off the power or to disconnect the particular stall shock device; (2) The adjustment range is very large, being from about 5 inches to about 48 inches; (3) The whole device is largely insulated, only the shock rod and alligator clip being exposed; and (4) The aluminum rod is highly resistant to corrosive forces.

What is claimed is:

1. An electrical shock device for use in cattle or other animal stalls for persuading the animal against occupying certain positions in the stall, said device including:

a. an elongated tubular support member of insulating material,
   (a-1) said tubular member having a continuous bore and a continuous lengthwise slot extending downwardly from said bore to the outer surface of said tubular member;
   (b) an electrical shock rod of conductive material supported by said tubular member,
   (b-1) said rod being generally rectangular in cross section and having a thickness corresponding to that of said slot in said tubular member;
   (b-2) the upper portion of said rod having at spaced intervals therealong lateral projections for supporting said bar in the axial bore of said tubular member, the lower portion of said rod projecting through said slot beyond the outer surface of said tubular member;
   (c) first and second suspension cords for suspending opposite ends of said tubular member from an overhead electrical high-voltage line conductor, one end of each cord being connected to opposite ends of said tubular member, the other end of each cord being looped about said line conductor;
   (c-1) said first suspension cord being an insulated electrical conductor and means for connecting the upper end of said first cord to said line conductor and the lower end to said shock rod;
   (d) first and second reels, one for each of said cords, and about which said cords are wound, with both ends of each cord projecting from the reel;
   (d-1) a sidewall of each reel being provided with a plurality of spaced holes along a path equidistant from the center axis of said reel;
   (d-2) a generally rectangular frame for each reel, said frame having a cross pin on which said reel is supported for rotational movement;
   (d-3) a plurality of posts extending inwardly from one side of said frame and positioned to be received within said holes in said reel sidewall;
   (d-4) a biasing spring supported on said cross pin between the opposite wall of said frame and said reel, said spring urging said reel toward said one side of said frame having said posts.

2. A device according to claim 1 wherein said tubular member at each end thereof has a two-diameter stepped hole extending through said tubular member in a direction generally normal to the tube axis, said stepped hole having a larger-diameter lower portion and a smaller-diameter upper portion.

\* \* \* \* \*